United States Patent
Pacella et al.

(10) Patent No.: US 9,667,500 B2
(45) Date of Patent: May 30, 2017

(54) CONTEXTUAL VIRTUAL ROUTING UPDATES

(71) Applicant: Verizon Patent and Licensing Inc., Arlington, VA (US)

(72) Inventors: Dante J. Pacella, Charles Town, WV (US); Venkata Josyula, Ashburn, VA (US); Mani Tadayon, Leesburg, VA (US); Mark D. Carney, Sterling, VA (US); Christopher Allen Lenart, Fairfax, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 128 days.

(21) Appl. No.: 14/584,583

(22) Filed: Dec. 29, 2014

(65) Prior Publication Data

US 2016/0191325 A1    Jun. 30, 2016

(51) Int. Cl.
*H04L 12/24* (2006.01)
*H04L 12/733* (2013.01)
*H04L 12/775* (2013.01)

(52) U.S. Cl.
CPC .............. *H04L 41/12* (2013.01); *H04L 45/20* (2013.01); *H04L 45/58* (2013.01)

(58) Field of Classification Search
CPC ....... H04L 45/021; H04L 45/02; H04L 45/00; H04L 41/12; H04L 45/58; H04L 45/20
See application file for complete search history.

(56) References Cited

U.S. PATENT DOCUMENTS

| | | | |
|---|---|---|---|
| 8,072,901 B1* | 12/2011 | Blair | H04L 45/00 370/254 |
| 2003/0088529 A1* | 5/2003 | Klinker | H04L 45/00 706/3 |
| 2004/0221296 A1* | 11/2004 | Ogielski | H04L 12/24 719/313 |

* cited by examiner

*Primary Examiner* — Ayaz Sheikh
*Assistant Examiner* — Debebe Asefa

(57) ABSTRACT

A computer system may include logic configured to generate a topology model of an autonomous system; detect a route advertisement, relating to an external autonomous system, from a Border Gateway Protocol (BGP) router; select a client BGP router; determine a next hop destination to the external autonomous system for the selected second BGP router, based on the detected route advertisement and based on the generated topology model; and provide the determined next hop destination to the selected client BGP router.

20 Claims, 12 Drawing Sheets

CONTEXTUAL VIRTUAL ROUTING UPDATES

BACKGROUND INFORMATION

A communication network within the Internet may be defined as an autonomous system (AS). An AS may be a collection of Internet Protocol (IP) routing prefixes with a defined routing policy with respect to the Internet. For example, a large company, an organization, an Internet Service Provider (ISP), and/or a communication services provider that includes an Internet backbone may manage a different AS. Thus, packets exchanged between a customer device, which uses an ISP to connect to a server device, and the server device may traverse a first AS associated with the ISP, a second AS associated with an Internet backbone, and a third AS associated with the company's private network. Routing and reachability information between different autonomous systems may be exchanged using Border Gateway Protocol (BGP). Devices configured with BGP may be referred to as BGP routers. Managing an AS with a large number of BGP routers may be challenging.

DETAILED DESCRIPTION OF PREFERRED EMBODIMENTS

Figure 1:
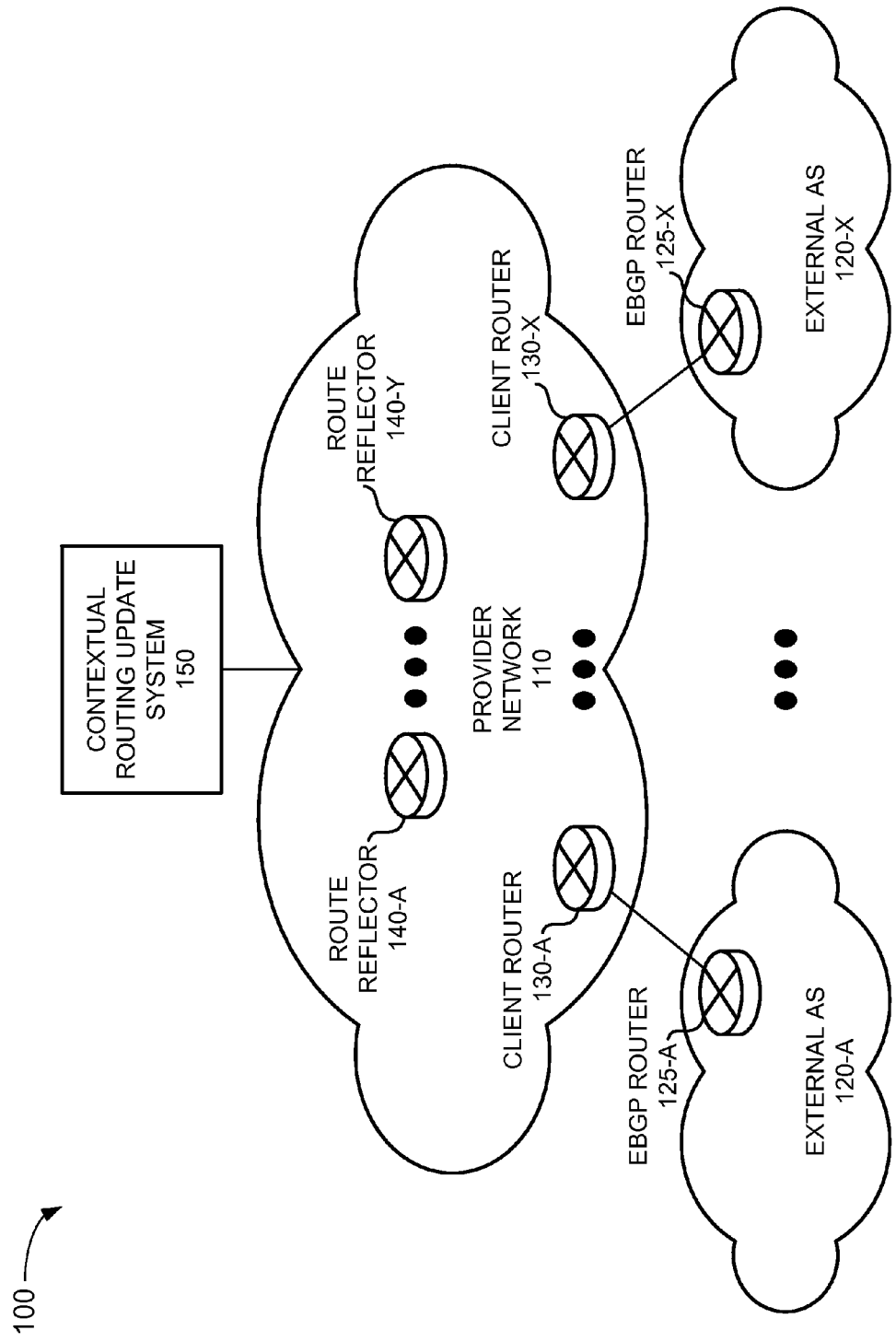
FIG. 1 is a diagram illustrating an exemplary environment according to an implementation described herein.

The following detailed description refers to the accompanying drawings. The same reference numbers in different drawings identify the same or similar elements.

A first AS and a second AS may exchange routing and/or reachability information using external BGP (EBGP). In order for a third AS to receive routing and/or reachability information about the first AS via the second AS, the routing and/or reachability information may need to traverse the second AS. Routing and/or reachability information within an AS may be exchanged using internal BGP (IBGP). In order for any external routing information (e.g., how to reach a particular external AS) to be distributed to all other BGP routers within an AS, all BGP routers within the AS may need to have full-mesh connectivity. As the number of BGP routers in an AS increases to n, the number of IBGP sessions required for full mess connectivity increases by $n*(n-1)/2$, resulting in a scaling problem.

The scaling problem may be alleviated by using route reflectors. A route reflector may be a BGP router configured to reflect routing information to a group of client BGP routers. Thus, when a BGP router receives a route advertisement from an external AS via EBGP, the BGP router may forward the route advertisement to a route reflector via IBGP, and the route reflector may forward the route advertisement to all its client routers via IBGP. As the ratio of route reflectors to client routers grows, the number of IBGP sessions that needs to be maintained in the AS drops significantly.

As a network grows in size, the number of route reflectors itself may increase to a large number. For example, a large AS may include hundreds of route reflectors. Maintaining a large number of route reflectors may be expensive and may tax the resources of a network. Route reflectors may communicate with each other using an out-of-band method in which the control plane is abstracted from the forwarding plane. Out-of-band route reflectors may be virtualized to reduce cost. Furthermore, virtualized route reflectors may be consolidated into a small number of devices, with each device running multiple virtual route reflectors. Consolidating virtual route reflectors may have significantly reduce costs by freeing up devices running virtual route reflectors for directly processing customer traffic, rather than for managing the routing and reachability information in the network.

However, consolidating virtual route reflectors may result in client routers that are remote from the route reflectors in terms of the network topology. For example, in an AS with a large number of route reflectors, a route reflector in a remote location may pick a best path with proximity to itself for a multi-homed route to an external AS (e.g., an external AS accessible through multiple routers), rather than pick a best path with respect to a local client router. Thus, remote routers may lose reachability information for other local routers.

One way to address this issue may be through the "additional path" feature available in BGP. The additional path feature enables multiple paths to be announced for each route. However, use of the additional path feature consumes network resources. For example, if a virtual route reflector reflects multiple paths so that each client router can make its own best path decision based on IBGP cost from the client router to other next hop destinations, each client router may require additional memory to perform these calculations. In an AS with thousands of edge routers, such a requirement may outweigh the cost savings in consolidating virtual route reflectors.

Another way to address the above issue may be by constructing communication tunnels from each virtual route reflector to remote client routers. However, such communication tunnels may have provisioning, maintenance, troubleshooting, and/or scaling requirements that would exert significant pressures on resources of a network, thus offsetting the gains in consolidating virtual route reflectors.

Implementations described herein relate to contextual virtual routing updates managed by a contextual routing update system and/or by route reflectors. A route reflector may include a topology manager that maintains a topology model for a network corresponding to a particular AS. The topology manager may participate in IBGP and may incorporate all real-time metric updates for the network for each next-hop destination in the network. In some implementations, the topology manager may be centralized in a contextual routing update system and topology model information may be distributed to particular route reflectors. In other implementations, a topology manager may be local to a particular route reflector.

A contextual routing update system, and/or a route reflector (which may or may not correspond to a virtual route reflector), may maintain a routing information database for each client router. In response to detecting a routing update (e.g., routing advertisement from an external AS received by an edge router via EBGP and forwarded to the route reflector), the route reflector may determine a best next hop destination for each of its edge routers using the topology model maintained by the topology manager. For example, the contextual routing update system, and/or the route reflector, may select a client router, may determine the next hop destination to the external AS for the selected client router using the received route advertisement and using the topology model, and may provide the determined next hop destination to the selected client router. The route reflector may perform this process for each of its client routers.

The topology model may include fixed topology information for the network. The fixed topology information may include, for example, link costs for particular links in the network, link latency scores for particular links in the network, BGP path attributes for particular links in the network, and/or other types of fixed topology parameters.

Furthermore, the topology manager may collect and manage traffic modeling information relating to the network. The contextual routing update system, and/or a route reflector, may additionally use the traffic modeling information when selecting a next hop destination for a client router. The traffic modeling information may include dynamic topology information such as, for example, current link utilization data for a link in the network, historical link utilization data for a link, link reservation data for the link, current router usage data for a router in the network, historical router usage data for the router, and/or other types of dynamic topology information.

Still further, the topology manager may collect qualified best path information relating to the network. The contextual routing update system, and/or a route reflector, may additionally use the qualified best path information when selecting a next hop destination for a client router. The qualified best path information may include, for example, maintenance schedules for particular links or routers, link reliability scores for particular links, route stickiness scores for particular routes that determine whether other routes should be moved before a particular route, route priority scores that measure whether a route has a priority to stay unchanged or a priority to optimize the route, route synchronicity information that indicates whether a pair of routes should be moved together, route symmetry information that indicates whether route traffic in both directions between two end points should follow the same path, route change information that indicates whether preference should be given to minimize a number of changes for a route or to minimize the number of reachability advertisements, and/or other types of qualified best path information.

Still further, the topology manager may collect redundancy information relating to the network. The contextual routing update system, and/or a route reflector, may additionally use the redundancy information when selecting a next hop destination for a client router. The redundancy information may include, for example, shared risk resource group information, disaster recovery geolocation information, and/or other types of redundancy information.

Still further, the topology manager may collect business constraints information relating to the network. The contextual routing update system, and/or a route reflector, may additionally use the business constraints information when selecting a next hop destination for a client router. The business constraints information may include, for example, financial cost information for particular links, partnership agreements for particular links, customer service agreements for particular links, and/or other types of business constraints information.

The contextual routing update system, and/or a route reflector, may determine a next hop destination and/or best path for a client router based on one or more of the fixed topology information, traffic modeling information, qualified best path information, redundancy information, business constraints information, and/or other types of information. Such information may be obtained by the topology manager. For example, the topology manager may calculate link scores for particular links and/or routes using a weighted average in which a particular weight and/or threshold is assigned to particular parameters. A route, also referred to herein as a path, may include a series of links from one destination to another destination. The weights and/or thresholds may be configurable and may be selected based on a context. The context may correspond to a particular type of service, a particular time period, a particular geographic location, a particular customer, and/or another type of context parameter. The route reflector may select a next hop and/or best path for a client router to a particular external AS based on the link scores calculated using the weighted average.

In some implementations, the contextual routing update system, and/or a route reflector, may also determine best next hop destinations for EBGP sessions of client routers in the AS and/or for routers in an external AS. For example, The contextual routing update system, and/or a route reflector, may select an EBGP session for a client router, may determine a next hop destination to an external AS for the selected client router based on a detected route advertisement and information obtained by the topology manager, and may provide the determined next hop destination to the selected client router.

FIG. 1 is a diagram of an exemplary environment 100 in which the systems and/or methods described herein may be implemented. As shown in FIG. 1, environment 100 may include a provider network 110, external ASes 120-A to 120-N, and contextual routing update system 150.

Provider network 110 may correspond to an AS associated with a provider of communication services. For example, provider network 110 may enable external ASes 120-A to 120-N to communicate with each other. Provider network 110 may include one or more circuit-switched networks and/or packet-switched networks. Provider network 110 may include a local area network (LAN), a wide area network (WAN), a metropolitan area network (MAN), an ad hoc network, an intranet, the Internet, a fiber optic-based network, a wireless network, and/or any combination of these or other types of networks. Provider network 110 may include client routers 130-A to 130-X and route reflectors 140-A to 140-Y.

Client router 130 may include a router device configured to run IBGP sessions and/or EBGP sessions. Client router 130 may function as an edge router for provider network 110 (e.g., a provider edge (PE) router) and may provide a connection to external AS 120. Client router 130 may run an EBGP session with external AS 120. Client router 130 may receive routing and/or reachability information relating to other external AS 120 from a particular route reflector 140.

Route reflector 140 may be associated with a cluster of client routers 130 to which route reflector 140 reflects routing and/or reachability information received from another client router 130 or from another route reflector 140. For example, client router 130-A may receive an EBGP advertisement from EBGP router 125-A in external AS 120-A. The EBGP advertisement may include routing and/or reachability information for external AS 120-A, such as an indication of a new route, an indication of a faulty or unavailable route, an indication of a change in a BGP path attribute, and/or another type of routing/reachability information.

In response, client router 130-A may send an IBGP advertisement based on the received EBGP advertisement to its route reflector. Assume the route reflector for client router 130-A is route reflector 140-A. Route reflector 140-A may forward the IBGP advertisement to all other route reflectors 140-B to 140-Y in provider network 110. Route reflectors 140-A to 140-Y in provider network 110 may maintain full mesh connectivity with each other. Thus, each route reflector 140 may conduct IBGP sessions with other route reflectors 140 in provider network 110.

Furthermore, route reflector 140-A may also send an IBGP advertisement to all of its client routers 130. For example, assume that the cluster managed by route reflector 140-A includes client routers 130-A to 130-F (client routers 130-B to 130-F are not shown in FIG. 1 in order not to complicate FIG. 1). Thus, route reflector 140-A may need to send an IBGP routing advertisement to client routers 130-B to 130-F based on the routing advertisement received from client router 130-A. No advertisement may be sent to client router 130-A in order to avoid loops.

The IBGP route advertisements sent by route reflector 140-A may include next hop and/or best path information to external AS 120-A (from which the EBGP advertisement was received). Rather than determining the next hop and/or best path information to external AS 120-A from its own perspective (e.g., from its own routing table), route reflector 140-A may determine the next hop and/or best path information for each of the client routers 130 in its cluster based on the perspective of each client router 130. Thus, route reflector 140-A may maintain a routing information base (RIB), also referred to herein as a routing table, for each of its client routers 130.

Route reflector 140-A may determine entries in the RIB for client router 130 based on information maintained by a topology manager. In some implementations, the topology manager may reside in contextual routing update system 150. In other implementations, additionally or alternatively, the topology manager may reside locally in route reflector 140.

External AS 120 may include an AS with a different IP prefix than provider network 110. For example, external AS 120 may include a private IP network associated with an ISP, a company, and/or another type of organization; another provider of communication services that may or may not include an Internet backbone; a provider of wireless communication services; a communication network located in another country; and/or another type of external AS. External AS 120 may include one or more circuit-switched networks and/or packet-switched networks. External AS 120 may include a local area network (LAN), a wide area network (WAN), a metropolitan area network (MAN), an ad hoc network, an intranet, the Internet, a fiber optic-based network, a wireless network, and/or any combination of these or other types of networks. External AS 120 may include one or more EBGP routers 125. EBGP router 125 may function as an edge router for external AS 120 and may connect to client router 130 in provider network 110 and may establish an EBGP session with client router 130. Thus, EBGP router 125 may correspond to a customer edge (CE) router with respect to provider network 110. While FIG. 1 shows external AS 120 with a single EBGP router 125 connecting to a single client router 130 for illustrative purposes, in practice, external AS 120 may be multi-homed. Thus, external AS 120 may include multiple connections to provider network 110 via multiple client routers 130.

Contextual routing update system 150 may include one or more computer devices, such as server devices, which implement contextual virtual routing updates using a topology manager. The topology manager may maintain a topology model of provider network 110 that includes links between EBGP routers 125, client routers 130, and route reflectors 140. The topology model may include: fixed topology information relating to the links and/or routers; traffic modeling information relating to the links, routes, and/or routers; qualified best path information relating to the links, routes, and/or routers; redundancy information relating to the links and/or routers; business constraints relating to the links, routes, and/or routers; and/or other types of information relating to the links, routes, and/or routers. Contextual routing update system 150 may determine a best path and/or a next hop destination for a particular client router 130 to another router and/or to an external AS 120 and may provide information relating to the determined next hop destination and/or best path to a particular route reflector 140 associated with the particular client router 130, and/or directly to the particular client router 130.

Although FIG. 1 shows exemplary components of environment 100, in other implementations, environment 100 may include fewer components, different components, differently arranged components, or additional components than those depicted in FIG. 1. Additionally or alternatively, one or more components of environment 100 may perform functions described as being performed by one or more other components of environment 100.

Figure 2:
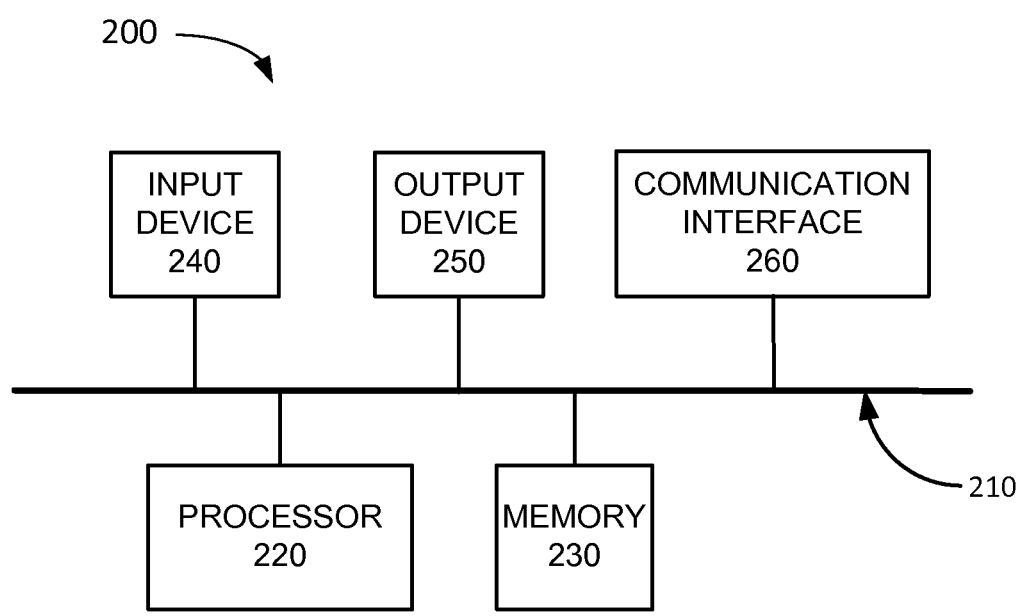
FIG. 2 is a diagram illustrating exemplary components of the contextual routing update system of FIG. 1.

FIG. 2 is a diagram illustrating exemplary components of a device 200. Contextual routing update system 150 may include one or more devices 200. Furthermore, control unit 440 of FIG. 4 may also include one or more devices 200. As shown in FIG. 2, device 200 may include a bus 210, a processor 220, a memory 230, an input device 240, an output device 250, and a communication interface 260.

Bus 210 may include a path that permits communication among the components of device 200. Processor 220 may include any type of single-core processor, multi-core processor, microprocessor, latch-based processor, and/or processing logic (or families of processors, microprocessors, and/or processing logics) that interprets and/or executes instructions. In other embodiments, processor 220 may include an application-specific integrated circuit (ASIC), a field-programmable gate array (FPGA), and/or another type of integrated circuit or processing logic.

Memory 230 may include any type of dynamic storage device that may store information and/or instructions, for execution by processor 220, and/or any type of non-volatile storage device that may store information for use by processor 220. For example, memory 230 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 240 may allow an operator to input information into device 200. Input device 240 may include, for example, a keyboard, a mouse, a pen, a microphone, a remote control, an audio capture device, an image and/or video capture device, a touch-screen display, and/or another type of input device. In some embodiments, device 200 may be managed remotely and may not include input device 240. In other words, device 200 may be "headless" and may not include a keyboard, for example.

Output device 250 may output information to an operator of device 200. Output device 250 may include a display, a printer, a speaker, and/or another type of output device. For example, device 200 may include a display, which may include a liquid-crystal display (LCD) for displaying content to the customer. In some embodiments, device 200 may be managed remotely and may not include output device 250. In other words, device 200 may be "headless" and may not include a display, for example.

Communication interface 260 may include a transceiver that enables device 200 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 260 may include a transmitter that converts baseband signals to radio frequency (RF) signals and/or a receiver that converts RF signals to baseband signals. Communication interface 260 may be coupled to an antenna for transmitting and receiving RF signals.

Communication interface 260 may include a logical component that includes input and/or output ports, input and/or output systems, and/or other input and output components that facilitate the transmission of data to other devices. For example, communication interface 260 may include a network interface card (e.g., Ethernet card) for wired communications and/or a wireless network interface (e.g., a WiFi) card for wireless communications. Communication interface 260 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 200 may perform certain operations relating to contextual routing updates and/or a topology manager. Device 200 may perform these operations in response to processor 220 executing software instructions contained in a computer-readable medium, such as memory 230. A computer-readable medium may be defined as a non-transitory memory device. A memory device may be implemented within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of, or in combination with, software instructions to implement processes described herein. Thus, implementations described herein are not limited to any specific combination of hardware circuitry and software.

Although FIG. 2 shows exemplary components of device 200, in other implementations, device 200 may include fewer components, different components, additional components, or differently arranged components than those depicted in FIG. 2. Additionally or alternatively, one or more components of device 200 may perform one or more tasks described as being performed by one or more other components of device 200.

Figure 3:
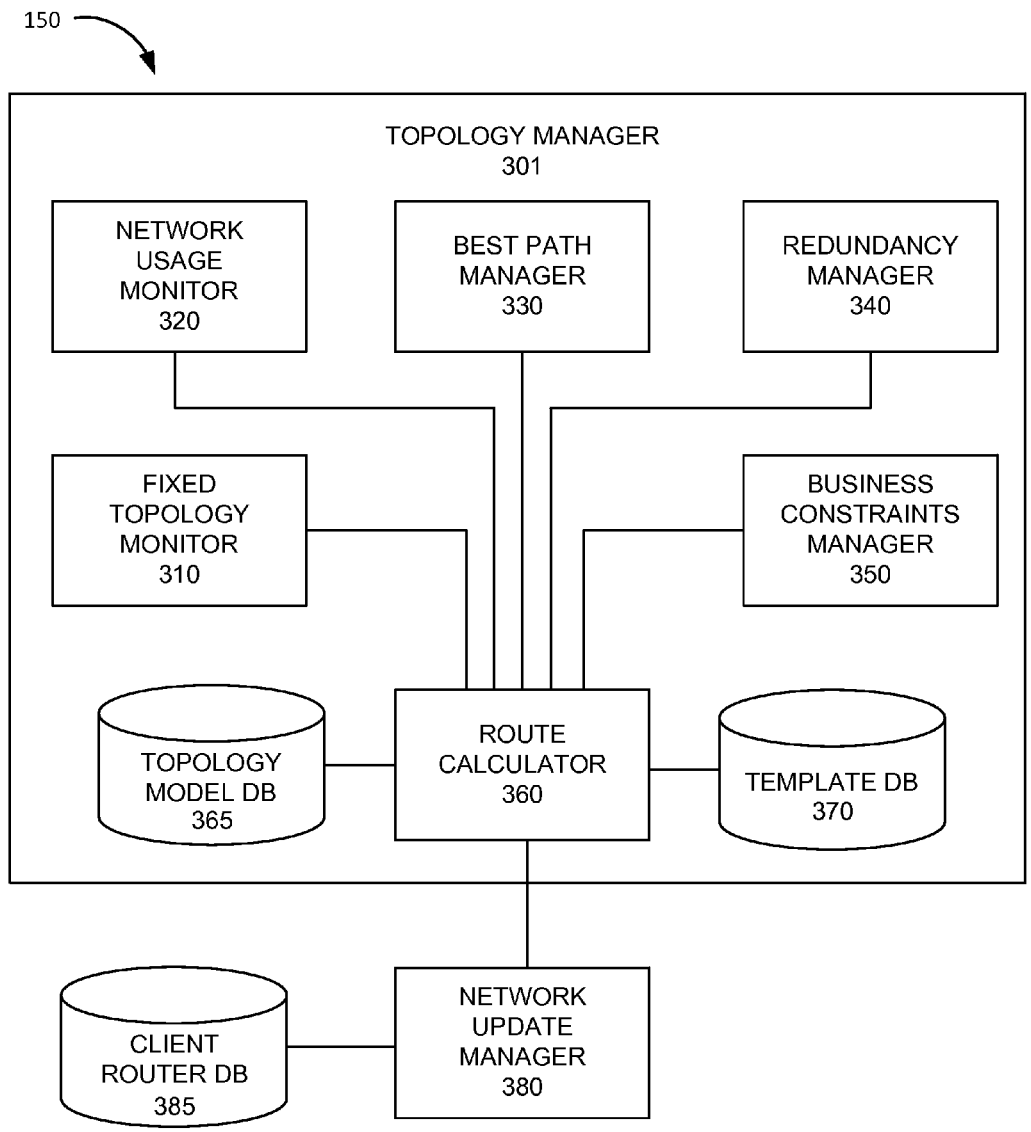
FIG. 3 is a diagram illustrating exemplary functional components of the contextual routing update system of FIG. 1.

FIG. 3 is a diagram illustrating exemplary functional components of contextual routing update system 150. In some implementations, the functional components of contextual routing update system 150 may be implemented, for example, via processor 220 executing instructions from memory 230. Alternatively, some or all of the functional components of contextual routing update system 150 may be implemented via hard-wired circuitry. As shown in FIG. 3, contextual routing update system 150 may include a topology manager 301, a network update manager 380, and a client router database (DB) 385.

Topology manager 301 may obtain topology information for provider network 110 and may generate and maintain a topology model for provider network 110 based on the obtained topology information. Topology manager 301 may include a fixed topology monitor 310, a network usage monitor 320, a best path manager 330, a redundancy manager 340, a business constraints manager 350, a route calculator 360, a topology model DB 365, and a template DB 370.

Fixed topology monitor 310 may obtain fixed topology information for provider network 110 and may provide the obtained fixed topology information to route calculator 360. For example, fixed topology monitor 310 may obtain fixed topology information for provider network 110, such as which interfaces of particular router device are connected to which other interfaces to form links, link costs associated with particular links, link latency scores associated with particular links, BGP attributes for particular links, and/or other types of topology information. The topology information may be obtained from another system associated with provider network 110, such as a provisioning system, may be obtained by polling router devices in provider network 110, may be manually entered by an administrator, and/or may be obtained using another technique. Fixed topology monitor 310 may monitor for changes in the topology information and may provide information relating to any detected change in the topology information to route calculator 360.

Network usage monitor 320 may obtain network usage information relating to provider network 110 and may provide the obtained network usage information to route calculator 360. The network usage information may include traffic modeling information relating to the network, such as current usage information for particular devices, links, and/or routes, historical usage information for particular devices, links, and/or routes, reservation information for particular devices, links, and/or routes, and/or other types of network usage information. The network usage information may be obtained from another system associated with provider network 110, such as a network usage monitoring system, may be obtained by polling router devices in provider network, and/or may be obtained using another technique.

Best path manager 330 may determine qualified best path information relating to provider network 110 and may provide the determined qualified best path information to route calculator 360. The qualified best path information may be used to determine a best path for a particular destination with respect to a particular client router 130 based on one or more parameters. The parameters may include: a maintenance schedule for particular links or routers; link reliability scores for particular links and/or routes; route stickiness scores, for particular routes, that measure whether other routes should be modified before a particular route; route priority scores, for particular routes, that measure whether a route has a priority to stay unchanged or a priority to optimize the route; route synchronicity information that indicates whether a pair of routes should be modified together; route symmetry information that indicates that route traffic in both directions between two end points should follow the same path; route change information that indicates whether preference should be given to minimize a number of changes for a route or to minimize the number of reachability advertisements; and/or other types of qualified best path information. The qualified best path information may be collected from various sources, such as other systems associated with provider network 110. For example, maintenance schedules may be obtained from a dispatch center for technicians, link reliability scores may be obtained from performance monitoring system, route symmetry information may be obtained from an ordering system that manages customer requirements information for particular routes, etc.

Redundancy manager 340 may manage redundancy information relating to provider network 110 and may provide the determined redundancy information to route calculator 360. For example, redundancy manager 340 may obtain shared risk link group (SRLG) information relating to links in provider network 110, geolocation information for router devices in provider network 110, and/or other types of information. The redundancy information may be used to construct failure assessments for links between various next hop destinations from the perspective of a particular client router 130. For example, the SRLG information may include information about whether particular links share a same line card, a same chassis, and/or a same transport cable. In order for a pair of links to provide redundancy, the pair should not be in the same SRLG, since an equipment failure may result in both links going down. Thus, if a best path is selected for a destination from client router 130, a best redundant path may be selected from a different SRLG. Similarly, disaster recovery requirements may require that router devices associated with a best redundant path be a particular geographic distance from router devices associated with a best path and geographic information for router devices may be used to determine whether this requirement is satisfied.

Business constraints manager 350 may manage business constraints information relating to provider network 110 and may provide the determined business constraints information to route calculator 360. For example, business agreements may require that a particular link and/or route be operated above a particular percent capacity, that a pair of links and/or routes be operated at a particular ratio in terms of traffic, that a particular link and/or route be operated below a particular cost, and/or other types of business constraints. The business constraints information may be obtained, for example, from an ordering system associated with provider network 110.

Route calculator 360 may calculate link scores and/or route scores for the various parameters for particular links in provider network and may store the calculated link scores in topology model DB 365. Topology model DB 365 may store a topology model for provider network 110. Exemplary information that may be stored in topology model DB 365 is described below with reference to FIG. 6A.

Furthermore, route calculator 360 may use the calculated link scores and/or route scores to determine a best path and/or next hop destination for a particular client router 130 to a particular destination, for a particular context, using a weighted average of the link scores and/or route scores for the various parameters. Route calculator 360 may obtain a set of weights for a particular context from template DB 370. Template DB 370 may store templates associated with particular contexts. Exemplary information that may be stored in template DB 370 is described below with reference to FIG. 6B.

Network update manager 380 may use the information generated by route calculator 360 to update a routing table for a particular client router 130 to determine a best next hop destination (as well as one or more redundant and/or next best destinations) for the particular client router 130 to a particular destination. Network update manager 380 may store the determined next hop destination in client router DB 385. Exemplary information that may be stored in client router DB 385 is described below with reference to FIG. 6C. Furthermore, network update manager 380 may provide an updated routing table to route reflector 140 associated with the particular client router 130.

Although FIG. 3 shows exemplary functional components of contextual routing update system 150, in other implementations, contextual routing update system 150 may include fewer functional components, different functional components, differently arranged functional components, or additional functional components than those depicted in FIG. 3. Additionally or alternatively, one or more functional components of contextual routing update system 150 may perform functions described as being performed by one or more other functional components of contextual routing update system 150.

Figure 4:
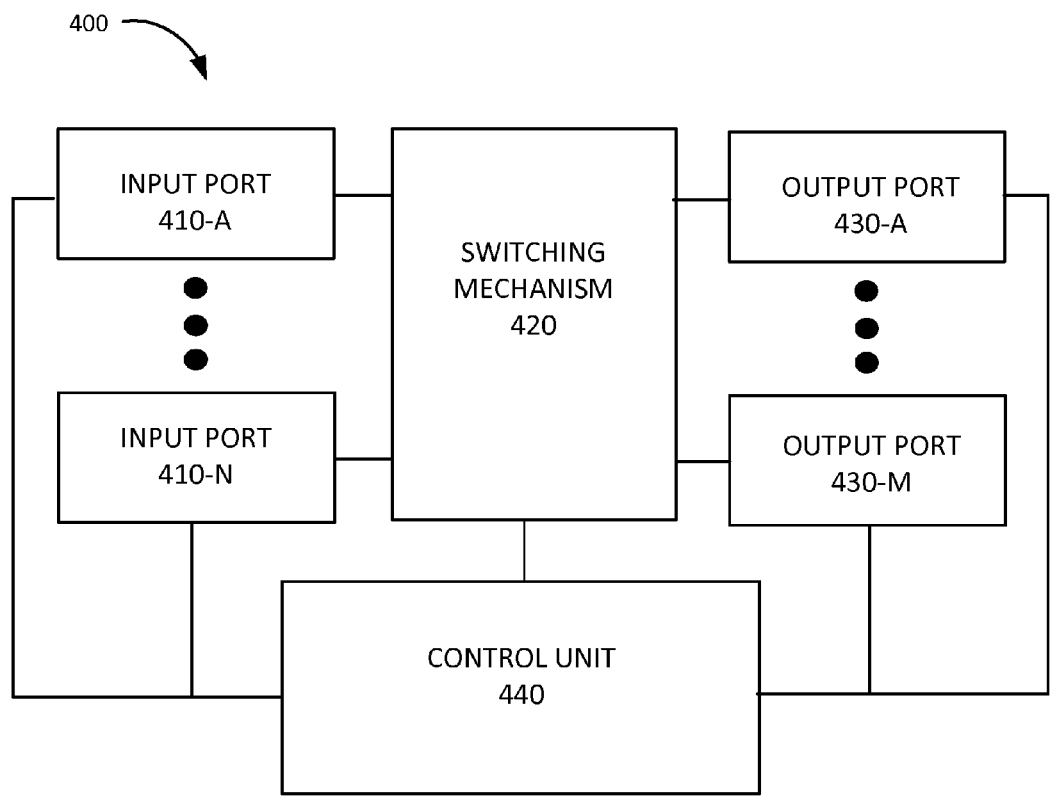
FIG. 4 is a diagram illustrating exemplary components of a router device of FIG. 1.

FIG. 4 is a diagram illustrating example components of router device 400. Each of EBGP router 125, client router 130, and/or route reflector 140 may include one or more router devices 400. As shown in FIG. 4, router device 400 may include one or more input units 410-A to 410-N (referred to herein individually as "input unit 410" and collectively as "input units 310"), a switching mechanism 420, one or more output units 430-A to 430-M (referred to herein individually as "output unit 430" and collectively as "output units 430"), and/or a control unit 440.

Input units 410 may be the points of attachments for physical links and may be the points of entry for incoming traffic. An input unit 410 may be associated with an interface card. Input unit 410 may perform some or all of data plane processing associated with an incoming packet. Data plane processing may encompass looking up a destination address for an incoming packet, removing or changing a label associated with the packet, determining a path through switching mechanism 420, and/or filter the packet based on one or more firewall filters.

Switching mechanism 420 may include one or more switching planes and/or fabric cards to facilitate communication between input units 410 and output units 430. In one implementation, each of the switching planes and/or fabric cards may include a single or multi-stage switch of crossbar elements. In another implementation, each of the switching planes may include some other form(s) of switching elements. Additionally or alternatively, switching mechanism 420 may include one or more processors, one or more memories, and/or one or more paths that permit communication between input units 410 and output units 430.

Output units 430 may store traffic received from input units 410 and may schedule the traffic on one or more output physical links. An output unit 430 may be associated with an interface card. Output unit 430 may perform some or all of data plane processing associated with an outgoing packet. For example, output unit 430 may classify the packet based on a quality of service class, schedule the packet in a particular queue, add or change a label associated with the packet, and/or filter the packet based on one or more firewall filters.

Control unit 440 may interconnect with input units 410, switching mechanism 420, and/or output units 430 and may control operation of router device 400. For example, control unit 440 may perform control plane operations associated with router device 400 (e.g., control unit 440 may use routing protocols and may create one or more routing tables and/or one or more forwarding tables that are used in traffic forwarding). Furthermore, in some implementations, control unit 440 may communicate with a topology manager in contextual routing update system 150. In other implementations, control unit 440 may include a topology manager. As explained above with reference to FIG. 2, control unit 440 may include one or more devices 200.

Although FIG. 4 shows example components of router device 400, in other implementations, router device 400 may include fewer components, different components, differently arranged components, and/or additional components than depicted in FIG. 4. Additionally or alternatively, one or more components of router device 400 may perform one or more tasks described as being performed by one or more other components of router device 400.

Figure 5:
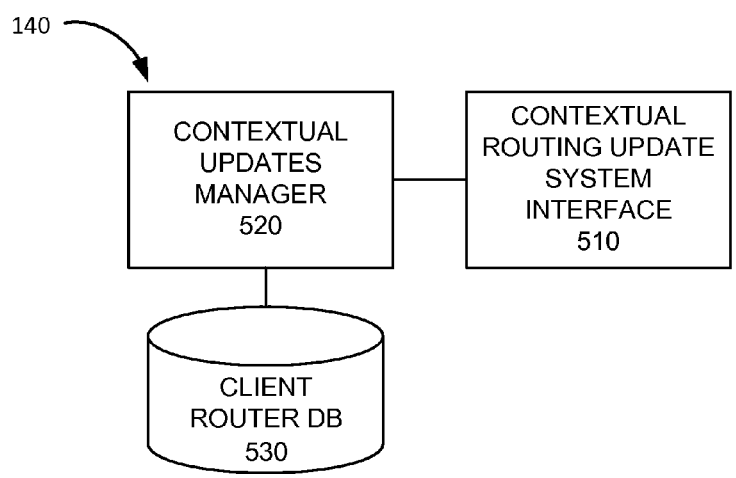
FIG. 5 is a diagram illustrating exemplary functional components of a route reflector of FIG. 1.

FIG. 5 is a diagram illustrating exemplary functional components of route reflector 440. In some implementations, the functional components of route reflector 440 may be implemented, for example, via processor 220 executing instructions from memory 230. Alternatively, some or all of the functional components of route reflector 440 may be implemented via hard-wired circuitry. As shown in FIG. 5, route reflector 440 may include a contextual routing update system interface 510, a contextual updates manager 520, and a client router DB 530.

Contextual routing update system interface 510 may communicate with contextual routing update system 150. For example, contextual routing update system interface 510 may receive, at particular time intervals and/or in response to a particular routing update event, an update to a routing table for a particular client router 130 in the cluster of route reflector 140.

Contextual updates manager 520 may update information in client router DB 530. Client router DB 530 may store routing tables for particular client routers 130 in the cluster of route reflector 140. Client router DB 530 may store information similar to the information stored in client router DB 385 and described below with reference to FIG. 6C. Furthermore, contextual updates manager 520 may send an IBGP message to client router 130 to provide information identifying a next hop destination form client router 130 to a particular destination (e.g., to a particular external AS 120).

In some implementations, some or all of the functional components described as being implemented in contextual routing update system 150 may be implemented in route reflector 140. Thus, in some implementations, route reflector 140 may perform some or all of the information gathering and/or route calculating tasks described above as being performed by contextual routing update system 150.

Although FIG. 5 shows exemplary functional components of route reflector 440, in other implementations, route reflector 440 may include fewer functional components, different functional components, differently arranged functional components, or additional functional components than those depicted in FIG. 5. Additionally or alternatively, one or more functional components of route reflector 4400 may perform functions described as being performed by one or more other functional components of route reflector 440.

Figure 6A:
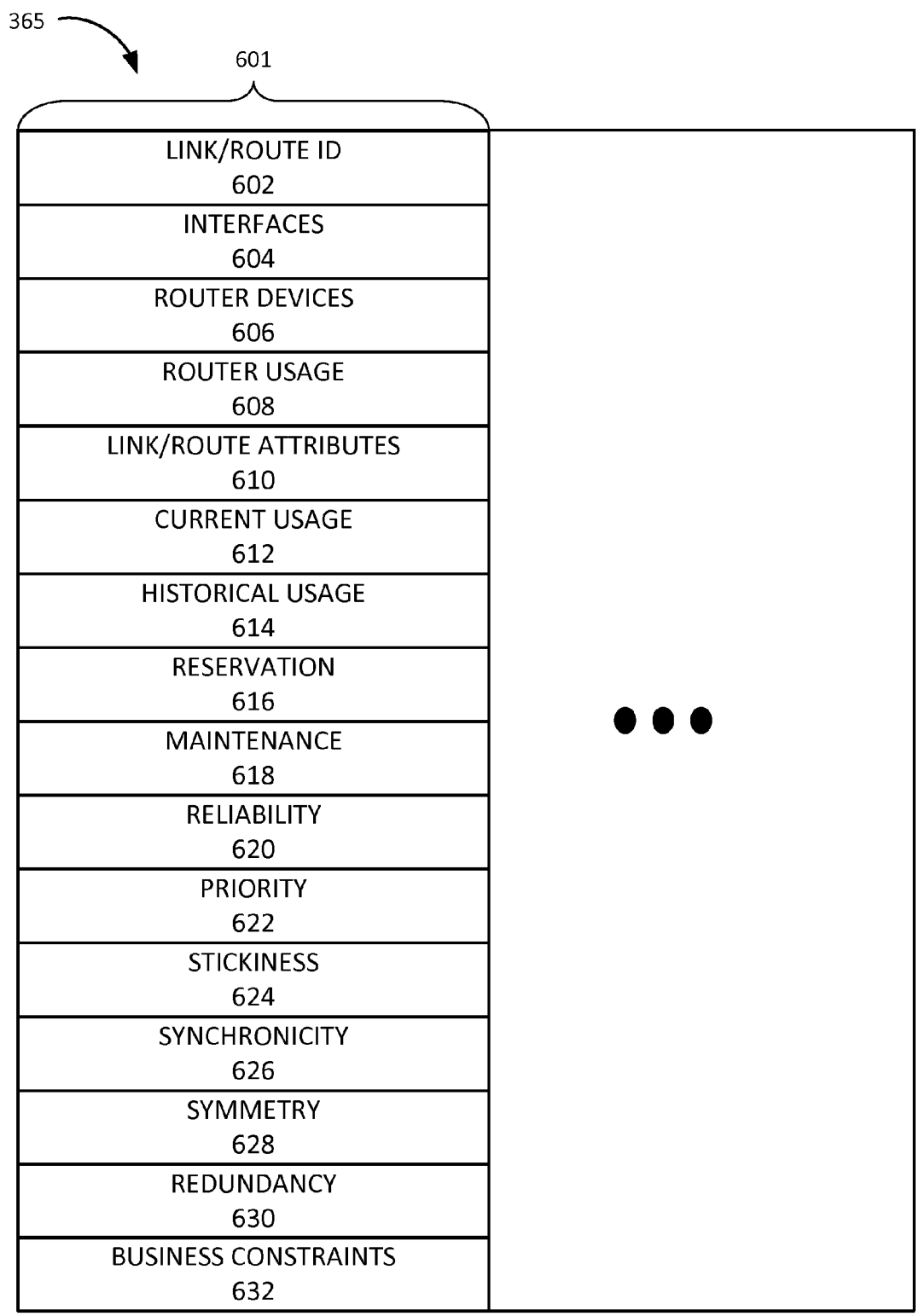
FIG. 6A is a diagram illustrating exemplary information that may be stored in the topology model database of FIG. 3.

FIG. 6A is a diagram illustrating exemplary information that may be stored in the topology model DB 365. As shown in FIG. 6A, topology model DB 365 may store one or more link/route records 601. Each link/route record 601 may store information relating to a particular link or route in provider network 110. Link/route record 601 may include a link/route identifier (ID) field 602, an interfaces field 604, a router devices field 606, a router usage field 608, a link/route attributes field 610, a current usage field 612, a historical usage field 614, a reservation field 616, a maintenance field 618, a reliability field 620, a priority field 622, a stickiness field 624, a synchronicity field 626, a symmetry field 628, a redundancy field 630, and a business constraints field 632.

Link/route ID field 602 may store an identifier associated with a particular link and/or an identifier associated with a particular route. Interfaces field 604 may identify the interfaces associated with the particular link/route. As an example, interfaces field 604 may identify a first interface at a first end of the particular link and a second interface at a second end of the particular link. As another example, interfaces field 604 may list all the interfaces included in the particular route. Router devices field 606 may identify the router devices associated with the interfaces of the particular link/route. As an example, router devices field 606 may identify a first router device associated with the first interface and a second router device associated with the second interface. As another example, router devices field 606 may identify all routers included in a particular route.

Router usage field 608 may store route usage information for the router devices associated with the interfaces of the particular link/route. The router usage information may include historical router usage information and/or current router usage information (e.g., the most recently available router usage information). The router usage information may include, for example, processor load usage, processor load capacity, memory usage, memory capacity, status of particular interfaces of the router, and/or other types of router usage information.

Link/route attributes field 610 may include attributes associated with the particular link/route. For example, link attributes may include a cost associated with the particular link, a latency associated with the particular link, BGP attributes associated with the particular link, and/or other types of link attributes.

Current usage field 612 may store current (e.g., most recently available) usage statistics for the particular link/route. Historical usage field 614 may store historical usage statistics for the particular link/route (e.g., usage statistics during a particular time period, average usage statistics of the particular link over the particular time period, etc.). The link/route usage statistics may include, for example, the link/route status during a particular time period, the link/route capacity during the particular time period, the number of packets transmitted on the link/route during the particular time period, the transmission rate during the particular time period, and/or other type of link/route usage statistics.

Reservation field 616 may include reservation information for the particular link/route. The reservation information may indicate how much capacity of the link/route has been reserved for a particular route, circuit, and/or communication session as well as a traffic type (e.g., quality of service class) associated with a particular reservation.

Maintenance field 618 may store information identifying times at which the particular link/route will be down as a result of scheduled maintenance. Reliability field 620 may store information indicating a reliability score for the particular link/route. The reliability score may measure, for example, how often the link/route was down during a particular time period, the error rate associated with the link/route during the particular time period, the jitter rate associated with the link/route during the particular time period, and/or another measure of reliability.

Priority field 622 may store a priority associated with the particular link/route. The priority field may indicate whether the particular route has a priority to stay (e.g., to not change the links included in the particular route) or a priority to optimize. Stickiness field 624 may store a stickiness score for a route. The stickiness score may indicate whether other routes should be moved (e.g., changed to a different one or more links) before the particular route should be moved. Synchronicity field 626 may store information identifying other routes paired with the particular route. If the route is moved, the paired routes may also need to be moved with the route. Symmetry field 628 may store an indication as to whether the particular route is associated with a requirement that route traffic in both directions between two end points should follow the same path.

Redundancy field 630 may store redundancy information associated with the particular link/route. For example, the redundancy information may include information identifying a SRLG to which the particular link/route belongs, may identify a particular geographic area associated with the particular link/route, and/or may include other types of redundancy information. Business constraints field 632 may store business constraints information associated with the particular link/route. For example, the business constraints information may include information relating to business agreements associated with the particular link/route, such as a requirement that the particular link/route be operated above a particular percent capacity, that the particular link/route be operated at a particular traffic ratio with respect to another link/route, a requirement that the particular link/route include a particular percentage of a particular type of traffic, and/or other types of business constraints.

Although FIG. 6A shows exemplary fields of topology model DB 365, in other implementations, topology model DB 365 may include fewer fields, different fields, differently arranged fields, or additional fields than those depicted in FIG. 6A. For example, topology model DB 365 may store records relating to particular router devices, may store records relating to particular routes and metrics and/or requirements associated with the particular routes, may store records relating to particular external AS, and/or may store other types of records. Furthermore, in some implementations, topology model DB 365 may store records for EBGP links to external networks.

Figure 6B:
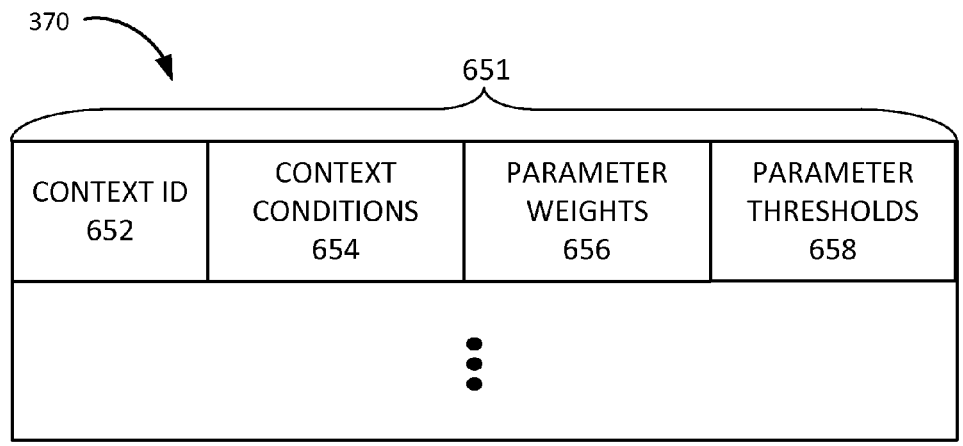
FIG. 6B is a diagram illustrating exemplary information that may be stored in the template database of FIG. 3.

FIG. 6B is a diagram illustrating exemplary information that may be stored in template DB 370. As shown in FIG. 6B, template DB 370 may store one or more template records 651. Template record 651 may store routing information for a particular context. Template record 651 may include a context ID field 652, a context conditions field 654, a parameter weights field 656, and a parameter thresholds field 658. Template DB 370 may include a default template that may be selected when no matching context is determined for a particular link.

Context ID field 652 may store an ID associated with a particular context. Context conditions field 654 may store one or more conditions associated with the particular context. The one or more conditions may identify when the particular context is invoked and may include, for example, a particular type of service (e.g., a particular quality of service class), a particular time period (e.g., time of day, day of week, range of calendar dates, etc.), a particular customer, and/or a particular geographic area.

Parameter weights field 656 may store a set of parameter weights associated with the particular context. The parameter weights may include weights for parameters stored in topology model DB 601, such as a weight for a link cost, a weight for a link usage score, a weight for a link reliability score, etc.

Parameter thresholds field 658 may store a set of parameter thresholds associated with the particular context. The parameter thresholds may include thresholds applied to particular parameters. For example, the parameter threshold may include an error rate threshold, a jitter rate threshold, a link load threshold, etc. If a particular threshold is exceeded for a parameter, the weight associated with the parameter may be applied to the parameter. Thus, for example, if the error rate threshold for a link is exceeded, a high error rate weight may be applied to the error rate score parameter, resulting in a high weighted average for the link. The high weighed average for the link may result in a high cost score for the link, which may result in another link being selected as a best next hop destination.

Although FIG. 6B shows exemplary fields of template DB 370, in other implementations, template DB 370 may include fewer fields, different fields, differently arranged fields, or additional fields than those depicted in FIG. 6B.

Figure 6C:
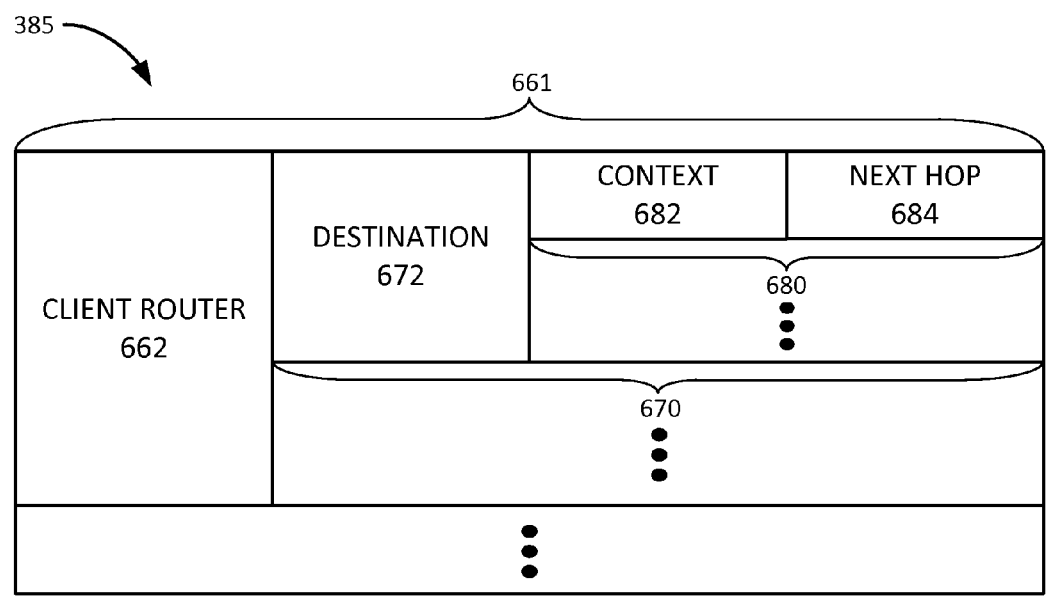
FIG. 6C is a diagram illustrating exemplary information that may be stored in the client router database of FIG. 3.

FIG. 6C is a diagram illustrating exemplary information that may be stored in client router DB 385. As shown in FIG. 6C, client router DB 385 may store one or more routing information base (RIB) records 661. RIB record 661 may store routing information for a particular client router 130. RIB record 661 may include a client router field 662 and one or more destination records 670. Client router field 662 may identify a particular client router 130 in provider network 110. Furthermore, client router field 662 may include information identifying route reflector 140 associated with the particular client router.

Each destination record 670 may store information relating to a particular destination, such as a particular external AS 120 connected to provider network 120. Destination record 670 may include a destination field 672 and one or more context records 680. Destination field 672 may identify the particular destination using an identifier, such as a particular IP prefix, a particular AS number, and/or another type of identifier.

Each context record 680 may identify a particular context. A context may identified based on one or more of a particular type of service or traffic (e.g., VoIP traffic, real-time video traffic, real-time data traffic, best effort traffic, etc.), based on a particular time period (e.g., time of day, day of week, range of calendar dates, etc.), based on a particular customer (e.g., a particular external AS 120, a route associated with a particular customer, etc.), based on a particular geographic area (e.g., packets originating from and/or being to an address associated with a particular location), and/or based on another type of parameter. Any type of identifier that may be included in a packet may be used to define a context. Context record 680 may include a context field 682 and a next hop field 684. Context field 682 may include one or more parameters identifying the particular context. Next hop field 684 may identify a ranked list of next hop destinations for the particular destination, given the particular context. The ranked list may include a best next hop, a second best next hop, a third next best hop, etc.

Although FIG. 6C shows exemplary fields of client router DB 385, in other implementations, client router DB 385 may include fewer fields, different fields, differently arranged fields, or additional fields than those depicted in FIG. 6C.

Figure 7:
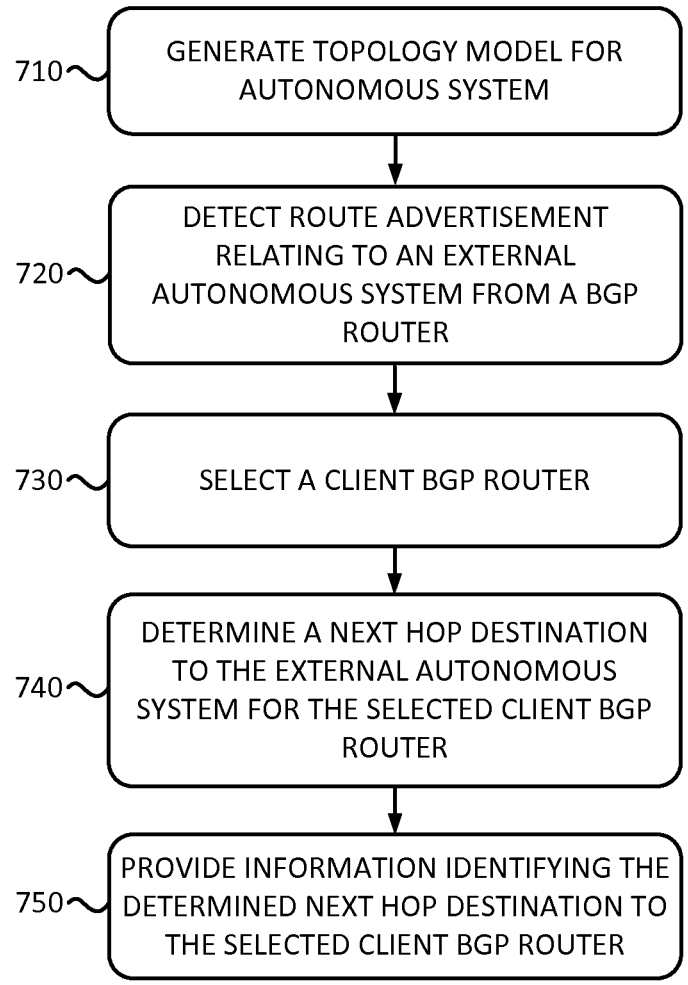
FIG. 7 is a flowchart of an exemplary process for determining a contextual routing update according to an implementation described herein.

FIG. 7 is a flowchart of an exemplary process for determining a contextual routing update according to an implementation described herein. In some implementations, the process of FIG. 7 may be performed by contextual routing update system 150. In other implementations, some or all of the process of FIG. 7 may be performed by another device or a group of devices separate from or including contextual routing update system 150, such as route reflector 140. Furthermore, in other implementations, the process of FIG. 7 may include fewer blocks, additional blocks, different blocks, or differently arranged blocks.

The process of FIG. 7 may include generating a topology model for the AS (block 710). For example, topology manager 301 may obtain topology information relating to provider network 110 and may use the obtained topology information to generate a topology model. Topology manager 301 may store the generated topology model in topology model DB 365. The topology model may include information relating to links and/or routes and router devices in provider network 110, including which two interface of which two router devices a particular link connects, a link cost for the particular link, a link latency score for the particular link, BGP attributes for the particular link, and/or other types of information relating to the link. In some implementations, the process of FIG. 7 may also be performed for EBGP links from provider network 110 to external networks. Furthermore, the topology model may include additional information as described above with reference to FIG. 6A, such as network usage and/or traffic modeling information, qualified best path information, redundancy information, business constraints information, and/or other types of information.

A route advertisement relating to an external autonomous system may be detected from a BGP router (block 720). For example, client router 140-A may receive a BGP route advertisement via EBGP from EBGP router 125-A, advertising a route to external AS 120-A. Client router 140-A may, in response, send an IBGP advertisement to route reflector 140-A. Route reflector 140-A may forward the IBGP advertisement to all other route reflectors 140 in provider network 110.

Route reflector 140-A may also forward the IBGP advertisement to contextual routing update system 150. Fixed topology monitor 310 may receive the IBGP advertisement and may update topology model DB 365 to indicate that a new destination is available. Furthermore, route reflector 140-A may need to determine a next hop destination to the advertised external AS 120-A for each of the client routers 130 in its cluster.

A client BGP router may be selected (block 730), a next hop destination to the external AS for the selected client BGP router may be determined (block 740), and information identifying the determined next hop destination may be provided to the selected client BGP router (block 750). For example, route calculator 360 may select a client router 130 in its cluster of client routers 130 and may determine a next hop destination to the external AS 120 associated with the received advertisement from the perspective of the selected client router 130. Thus, route calculator 360 may determine the best path (e.g., least cost) from the selected client router 130 to the external AS (e.g., to external AS 120-S) based on information stored in topology model DB 365. Route calculator 360 may then select the next hop destination based on the determined best path. Route calculator 360 may also select one or more next best paths and corresponding next best next hop destinations. Network update manager 380 may provide information identifying the determined next hop destination to route reflector 140-A. Route reflector 140-A may then send an IBGP message to the selected client router 130 to advertise the determined next hop destination for the external AS 120 from the selected client router 130.

Blocks 730, 740, and 750 may be repeated for each client router 130 in the cluster of route reflector 140-A. In some implementations, route reflector 140-A may request and obtain a next hop destination determination for other client routers 130 in its cluster from contextual routing update system 150 as explained above. In other implementations, route reflector 140-A may make a next hop destination determination for its client routers 130 based on information obtained from contextual routing update system 150. For example, route reflector 140-A may obtain the topology model from contextual routing update system 150 and may determine the next hop destination for each client router 130 in its cluster based on the obtained topology model. In still other implementations, route reflector 140-A may determine the next hop destination determination without interacting with contextual routing update system 150. For example, route reflector 140-A may include topology manager 301.

Figure 8A:
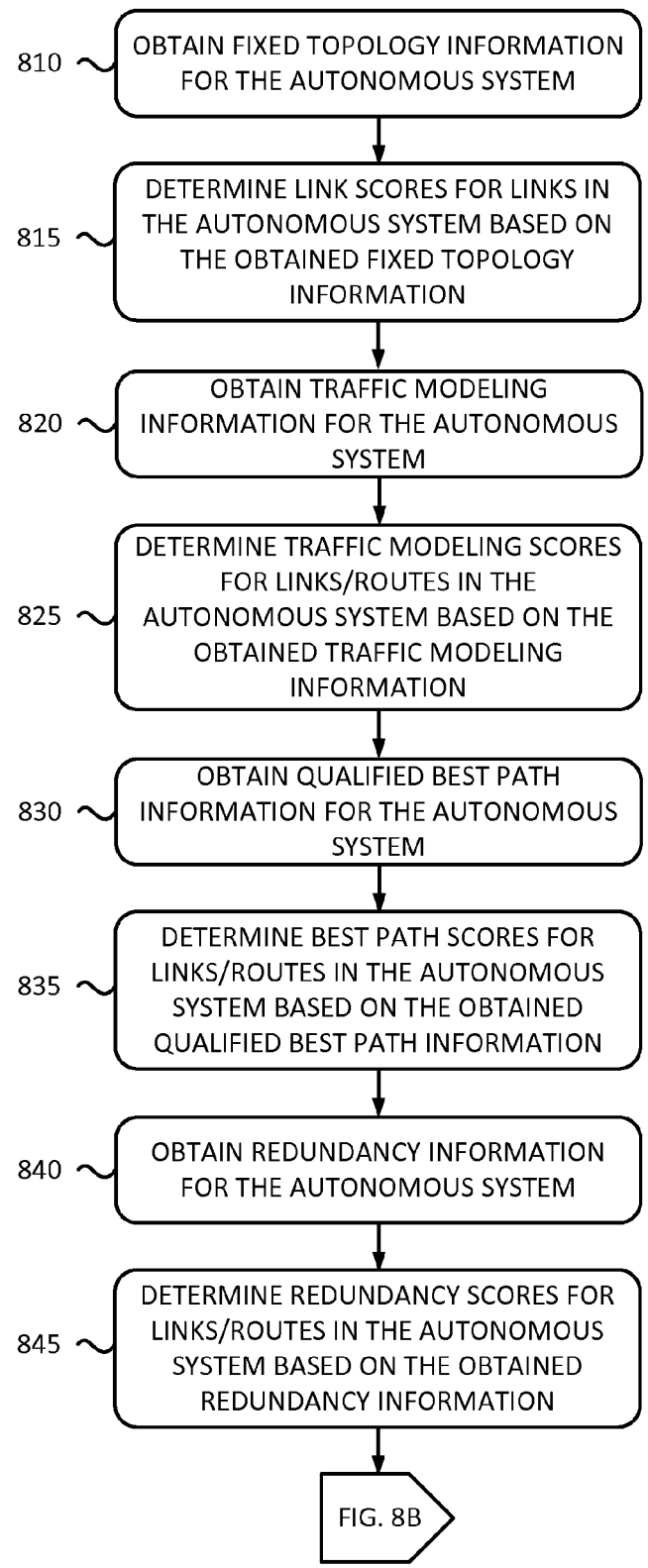
FIGS. 8A and 8B are flowcharts of an exemplary process for determining a contextual best path according to an implementation described herein.
Figure 8B:
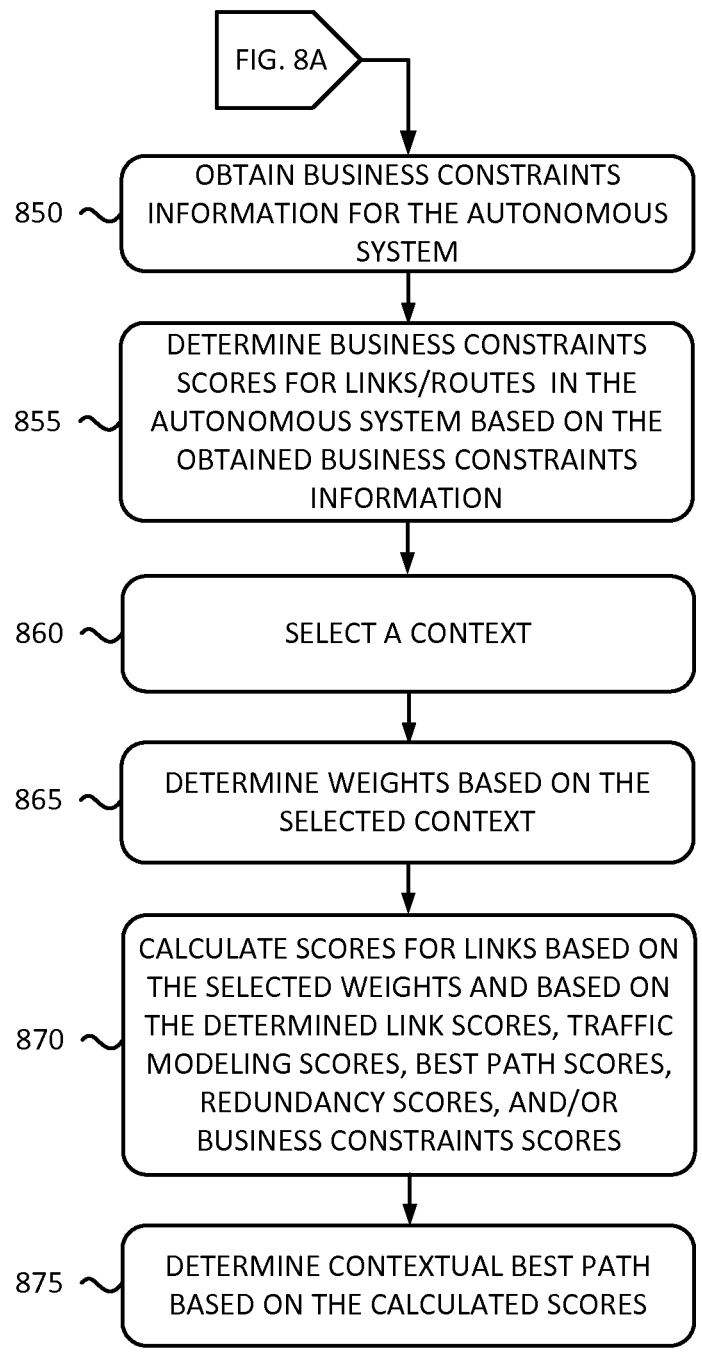

FIGS. 8A-8B are flowcharts of an exemplary process for determining a contextual best path according to an implementation described herein. In some implementations, the process of FIG. 7 may be performed by contextual routing update system 150. In other implementations, some or all of the processes of FIGS. 8A and 8B may be performed by another device or a group of devices separate from or including contextual routing update system 150, such as route reflector 140. Furthermore, in other implementations, the processes of FIGS. 8A and 8B may include fewer blocks, additional blocks, different blocks, or differently arranged blocks.

The process of FIG. 8A may include obtaining fixed topology information for the autonomous system (block 810) and link scores for links in the autonomous system may be determined based on the obtained fixed topology information (block 815). For example, fixed topology monitor 310 may obtain fixed topology information for provider network 110 from another system associated with provider network 110, such as a provisioning system. Additionally or alternatively, fixed topology monitor 310 may poll client router devices 130 and/or route reflectors 140 in provider network 110 to obtain fixed topology information, such as which interfaces of particular router device are connected to which other interfaces to form links, link costs associated with particular links, link latency scores associated with particular links, BGP attributes for particular links, and/or other types of topology information. Fixed topology monitor 310 may store the obtained information in topology model DB 365.

Traffic modeling information may be obtained for the autonomous system (block 820) and traffic modeling scores for links/routes in the autonomous system may be determined based on the obtained traffic modeling information (block 825). For example, network usage monitor 320 may obtain network usage and/or traffic modeling information for provider network 110 from another system associated with provider network 110, such as a network usage monitoring system. Additionally or alternatively, network usage monitor 320 may poll client router devices 130 and/or route reflectors 140 in provider network 110 to obtain network usage and/or traffic modeling information, such as, for example, current usage information for particular devices and/or links, historical usage information for particular devices and/or links, reservation information for particular devices and/or links, and/or other types of network usage information. Network usage monitor 320 may store the obtained information in topology model DB 365.

Qualified best path information for the autonomous system may be obtained (block 830) and best path scores for links/routes in the autonomous system may be determined based on the obtained qualified best path information (block 835). For example, best path manager 330 may obtain maintenance schedules from a dispatch center for technicians; may obtain link and/or route reliability scores from a performance monitoring system; may obtain route requirements information from an ordering system that manages customer requirements information for particular routes; and/or may obtain other types of best path information from other devices or systems associated with provider network 110. Other types of information gathered by best path manager 330 may include: route stickiness scores, for particular routes, that measure whether other routes should be moved before a particular route; route priority scores, for particular routes, that measure whether a route has a priority to stay unchanged or a priority to optimize the route, route synchronicity information that indicates that a pair of routes should be moved together; route symmetry information that indicates that route traffic in both directions between two end points should follow the same path; route change information that indicates whether preference should be given to minimize a number of changes for a route or to minimize the number of reachability advertisements; and/or other types of qualified best path information. Best path manager 330 may store the obtained information in topology model DB 365.

Redundancy information may be obtained for the autonomous system (block 840) and redundancy scores for links/routes in the autonomous system may be determined based on the obtained redundancy information (block 845). For example, redundancy manager 340 may obtain redundancy information, such as SRLG information, disaster recovery geographic location information, and/or other types of redundancy information. Redundancy manager 340 may store the obtained information in topology model DB 365.

Continuing with FIG. 8B, business constraints information may be obtained for the autonomous system (block 850) and business constraints scores for links/routes in the autonomous system may be determined based on the obtained business constraints information (block 855). For example, business constraints manager 350 may obtain business constraints information from, for example, an ordering system associated with provider network 110. The business constraints information may include, for example, an indication that a particular link/route is required to be operated at above a particular percent capacity, that a pair of links/routes are required to be operated at a particular ratio in terms of traffic, that a particular link/route is required to be operated below a particular cost, and/or other types of business constraints. Business constraints manager 350 may store the obtained information in topology model DB 365.

A context may be selected (block 860) and weights may be determined based on the selected context (block 865). For example, route calculator 360 may select a particular context for which to compute link/route scores. The particular context may be associated with an identifier included in data packets, such as: an identifier associated with a particular type of service (e.g., VoIP service, real-time video service, streaming video service, streaming audio, best effort traffic, etc.); an identifier associated with a particular customer; an identifier associated with a geographic area (e.g., a particular country, etc.); and/or another type of identifier. Router calculator 360 may retrieve a template associated with the selected context from template DB 370. The template may include a set of weights to be used to determine a weighted average of scores for link/route parameters used to determine a final link/route score for particular links/routes in provider network 110.

Scores for links may be calculated based on the selected weights and based on the determined link scores, traffic modeling scores, best path scores, redundancy scores, and/or business constraints scored (block 870). For example, route calculator 460 may calculate final link scores and/or final route scores by determining a weighted average of link scores and/or route scores stored in topology model 365 for various parameters, such as fixed link cost scores, latency scores, traffic modeling parameter scores, qualified best path scores, redundancy scores, and/or business constraints scores.

Some scores may be used to compute a next best path, rather than a best path. For example, redundancy scores may be used to select a next best path (e.g., a redundant path) for a particular path. Thus, if another path does not meet the redundancy requirements (e.g., is too close to the particular path or is in the same SRLG as the particular path), the other path will be associated with or assigned a low redundancy score. Such assignment may result in the other path not being selected as the next best path for the particular path.

A contextual best path may be determined based on the calculated scored (block 875). For example, route calculator 360 may select a best path for a particular client router 130 to a particular destination based on the calculated final link/route scores for available links and/or routes from the particular client router 130 to a particular destination (e.g., a particular external AS 120). Based on the selected best path, route calculator 360 may select the best next hop destination from the particular client router 130 to the particular destination.

Figure 9:
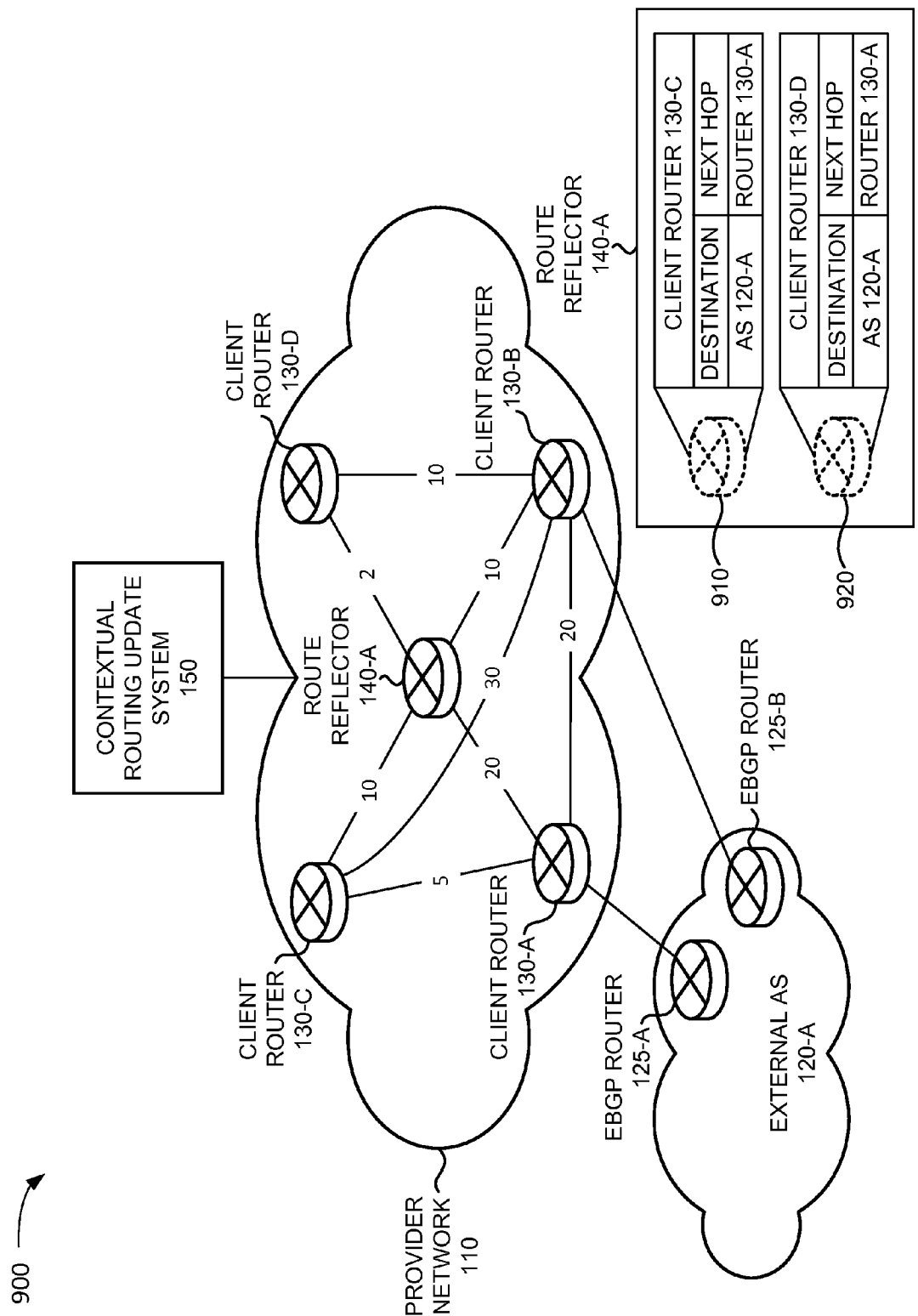
FIG. 9 is a diagram of a first exemplary scenario according to an implementation described herein.

FIG. 9 is a diagram of a first exemplary scenario 900 according to an implementation described herein. Scenario 900 includes external AS 120-A with two EBGP routers 125-A and 125-B. Assume external AS 120-A is connected to provider network 110 with two links: a link from EBGP router 125-A to client router 130-A and EBGP router 125-B to client router 130-B. EBGP router 125-A may send an EBGP advertisement to client router 130-A advertising the link and EBGP router 125-B may send an EBGP advertisement to client router 130-B advertising its link.

Assume client router 130-A and client router 130-B are both in the cluster of route reflector 140-A and send IBGP advertisements to route reflector 140-A based on the respective received EBGP advertisements from external AS 120-A. Assume that client routers 130-C and 130-D are also in the cluster of route reflector 140-A. Thus, route reflector 140-A may need to inform client routers 130-C and 130-D that external AS 120-A is reachable via client routers 130-A and 130-B.

If route reflector 140-A were merely to send an IBGP advertisement to client router 130-C, client router 130-C would not be able to pick the best route. For example, client router 130-C may receive the IBGP advertisement from route reflector 140-A via the link between client router 130-C and route reflector 140-A, which has a cost of 10. Thus, client router 130-C may determine that the best route to external AS 120-A is via the link to route reflector 140-A and then via the link from route reflector 140-A to client router 130-A, which has a cost of 10+20=30. Thus, client router 130-C may select route reflector 140-A as the best next hop destination to external AS 120-A. A link from client router 130-C to client router 130-A may exist with a cost of 5. However, client router 130-C may not be aware of this route, as client routers 130 may not exchange IBGP advertisements. Similarly, client router 130-D may not be aware of the best path to client router 130-B with a cost of 10, compared to a best route through route reflector 140-A, which has a cost of 12.

Thus, in order for client routers 130-C and 130-D to select the best path to external AS 120-A, route reflector 140-A may need to determine the best path for client routers 130-C and 130-D. Route reflector 140-A may maintain a RIB 910 for client router 130-C and a RIB 920 for client router 130-D. The entries in RIB 910 and 920 may be either generated by contextual routing update system 150 or generated by route reflector 140-A based on information obtained from contextual routing update system 150. Contextual routing update system 150 may generate and maintain a topology model for provider network 110. When route reflector 140-A receives the IBGP advertisements from client routers 130-A and 130-B, route reflector 140-A may forward the IBGP advertisements to contextual routing update system 150 and contextual routing update system 150 may update the topology model. Contextual routing update system 150 may then determine the best paths to external AS 120-A for client router 130-C and 130-D, or may provide an updated topology model to route reflector 140-A and route reflector 140-A may determine the best paths. Route reflector 140-A may then update RIB 910 for client router 130-C and RIB 920 for client router 130-D with the best next hop destination to the IP prefix associated with external AS 120-A. In this case, RIB 910 may updated with the best next hop destination to external AS 120-A being client router 130-A. In addition, for client 130-D, RIB 920 may be updated with the best next hop destination to external AS 120-A. In this case, the best next-hop destination is client router 130-B. Route reflector 140-A may then provide information identifying the determined best next hop destination to client routers 130-C and 130-D. For example, route reflector 140-A may send an IBGP advertisement to client routers 130-C and 130-D. In response to the advertisement, client routers 130-C and 130-D may update their RIB s.

Figure 10:
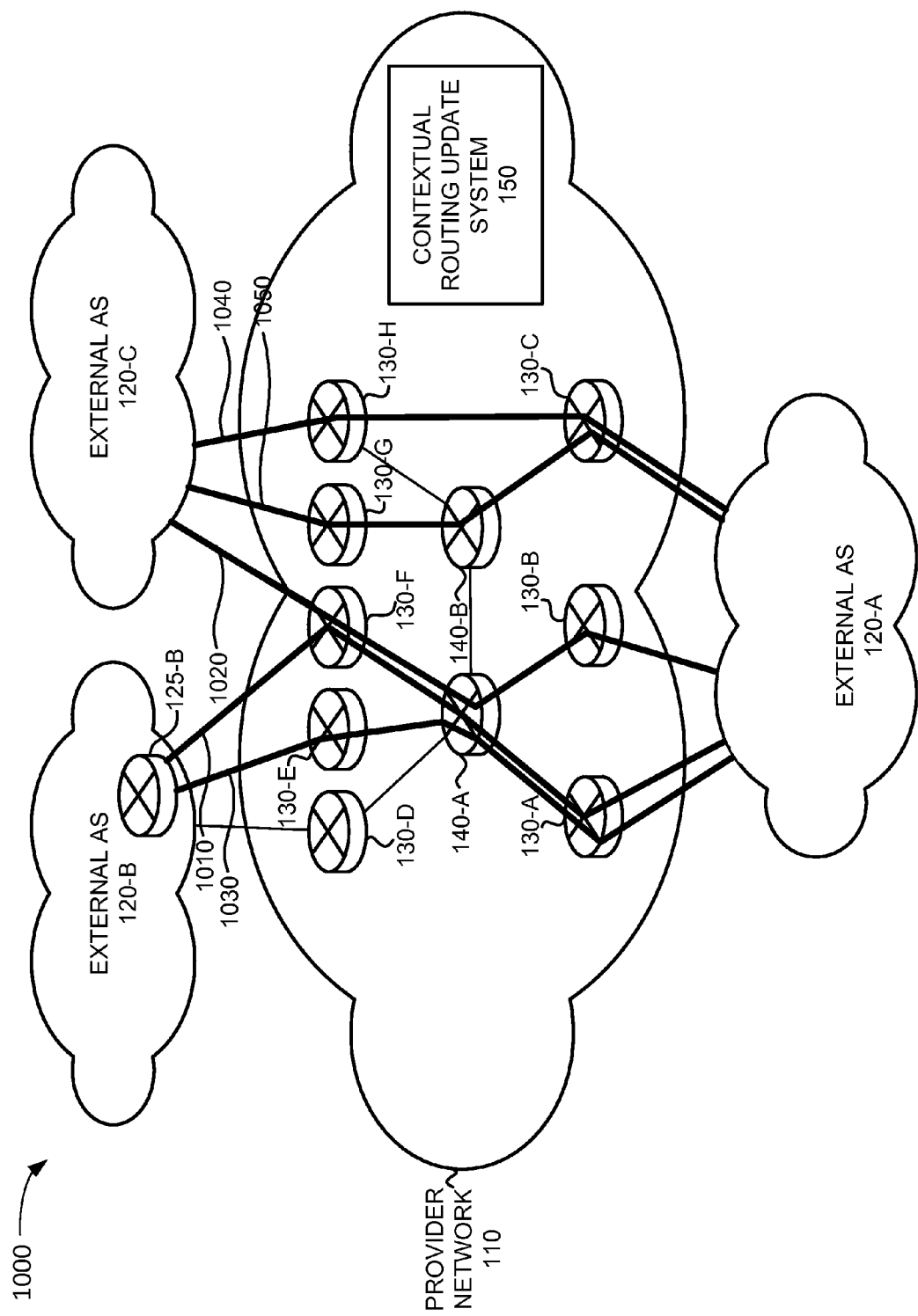
FIG. 10 is a diagram of a second exemplary scenario according to an implementation described herein.

FIG. 10 is a diagram of a second exemplary scenario 1000 according to an implementation described herein. As shown in FIG. 10, provider network 110 may include client routers 130-A, 130-B, and 130-C with links to external AS 120-A. Client routers 130-A and 130-B may have a link to route reflector 140-A and client router 130-C may have a link to route reflector 140-B. Furthermore, route reflector 140-A may have a link to client routers 130-D, 130-E, and 130-F and route reflector 140-B may have links to client routers 130-G and 130-H. Client routers 130-D, 130-E, and 130-F may have links to external AS 120-B, with client routers 130-E and 130-F having links to EBGP router 125-B.

Contextual routing update system 150 (not shown in FIG. 10) may maintain a RIB for EBGP router 125-B, in addition to routers in provider network 110 running IBGP sessions. Contextual routing update system 150 may select, as the best path from external AS 120-B to external AS 120-A, path 1010. Path 1010 includes EBGP router 125-B, client router 130-F, route reflector 140-A, and client router 130-A.

However, path 1020 from external AS 120-C may also run through client router 130-F and route reflector 140-A. Furthermore, assume that during particular times of day, the traffic on path 1020 becomes heavy, approaching the capacity of the link from client router 130-F to route reflector 140-A. Thus, network usage monitor 320 of topology manager 301 may report network usage data for the link, and route calculator 360 may assign a low network usage score to the link for a context associated with the times of day when the traffic is heavy at the link. Further, assume that path 1010 is associated with a priority to optimize, rather than a priority to stay (e.g., to not switch to one or more different links). Thus, contextual routing update system 150 may select to optimize the route. During the times of day with the heavy traffic on the link, contextual routing update system 150 may select a different route from EBGP router 125-B to external AS 120-A. For example, contextual routing update system 150 may select route 1030 that includes EBGP router 125-B, client router 130-E, route reflector 140-A, and client router 130-A.

Further, assume the best route selected from external AS 120-C to external AS 120-A is path 1040 that includes client router 130-H and client router 130-C. Further, assume that client router 130-H is scheduled for maintenance. Thus, for a context that includes a range of times for which client router 130-H is scheduled for maintenance, the best path may be switched by contextual routing update system 150 to path 1050, which includes client router 130-G, route reflector 140-B, and client router 130-C.

Figure 11:
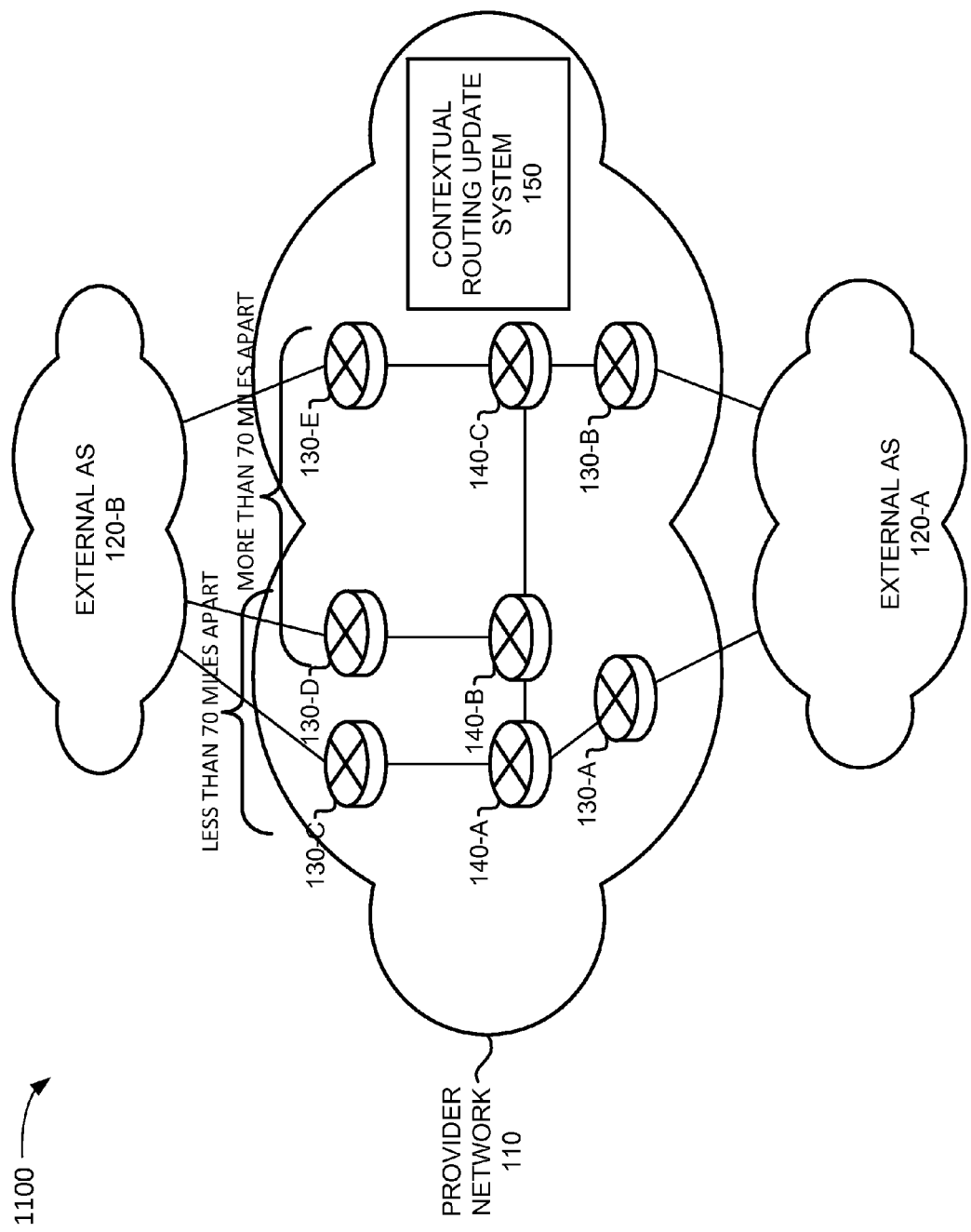
FIG. 11 is a diagram of a third exemplary scenario according to an implementation described herein.

FIG. 11 is a diagram of a third exemplary scenario 1100 according to an implementation described herein. Scenario 1100 illustrates the selection of a redundant path. As shown in FIG. 11, provider network 110 may include client routers 130-A, 130-B, 130-C, 130-D, and 130-E, and route reflectors 140-A, 140-B, and 140-C. Furthermore, provider network 110 may include three paths from external AS 120-A to external AS 120-B. The best path may be chosen as the path through client router 130-A, route reflector 140-A, and client router 130-C. The next best path may be the path through route reflector 140-B and client router 130-D. However, client routers 130-C and 130-D may be within 70 miles of each other, which may violate a disaster recovery plan that requires redundant paths to be at least 70 miles from each other. Thus, client router 140-D may be assigned a low redundancy score with respect to client router 130-C and may not be selected by contextual routing update system 150 as a redundant path. Instead, a path through client router 130-B, route reflector 140-C, and client router 130-E may be selected, because client router 130-E is located more than 70 miles from client routers 130-C and 130-D.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

As an example, while particular implementations have been described with respect to BGP routers, other implementations need to be confined to BGP routers. Rather, the systems and methods described herein may be applied to other types of routers and/or other types of routing protocols.

As another example, while a series of blocks have been described with respect to FIGS. 7, 8A, and 8B, the order of the blocks may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/ "comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

No element, act, or instruction used in the present application should be construed as critical or essential to the embodiments unless explicitly described as such. Also, as used herein, the articles "a," "an," and "the" are intended to include one or more items. Further, the phrase "based on" is intended to mean "based, at least in part, on" unless explicitly stated otherwise.

What is claimed is:

1. A method, performed by a computer device, the method comprising:
    generating, by the computer device, a topology model of an autonomous system associated with the computer device;
    detecting, by the computer device, a route advertisement, relating to an external autonomous system, from a Border Gateway Protocol (BGP) router;
    selecting, by the computer device, a client BGP router;
    determining, by the computer device, a next hop destination to the external autonomous system for the selected client BGP router, based on the detected route advertisement and based on the generated topology model;
    selecting, by the computer device, a context that specifies one or more of a particular quality of service class, an identifier identifying a particular customer, or a particular time period specifying a time of day, a day of week, or a range of calendar dates;
    determining, by the computer device, a best path for the selected context from the selected client BGP router to the external autonomous system; and
    providing, by the computer device, information identifying the determined next hop destination and the determined best path for the selected context to the selected client BGP router.

2. The method of claim 1, wherein the computer device includes a virtual route reflector.

3. The method of claim 1, further comprising:
    maintaining a routing information base for the selected client BGP router.

4. The method of claim 1, wherein the topology model includes:
    a link cost for a particular link,
    a link latency score for a particular link, or
    a BGP path attribute for a particular link.

5. The method of claim 1, further comprising:
    determining traffic modeling information for the autonomous system; and
    selecting the next hop destination for the selected client BGP router based on the determined traffic modeling information.

6. The method of claim 5, wherein the traffic modeling information includes:
    current link utilization data,
    historical link utilization data,
    link reservation data,
    current BGP router usage data, or
    historical BGP router usage data.

7. The method of claim 1, further comprising:
    determining qualified best path information for the autonomous system; and
    selecting the next hop destination for the selected client BGP router based on the determined qualified best path information.

8. The method of claim 7, wherein the qualified best path information includes:
    a maintenance schedule for a particular link or a particular BGP router,
    a link reliability score for the particular link,
    a route stickiness score for a route that includes a particular link,
    a route priority indication for the route,
    route symmetry information for the route, or
    route synchronicity information for the route.

9. The method of claim 1, further comprising:
    determining redundancy information for the autonomous system; and
    selecting the next hop destination for the selected client BGP router based on the determined redundancy information.

10. The method of claim 9, wherein the redundancy information includes:
    shared resource link group information; or
    geographic location information relating to BGP routers in the autonomous system.

11. The method of claim 1, further comprising:
    determining business constraints information for the autonomous system; and
    selecting the next hop destination for the selected client BGP router based on the determined business constraints information.

12. The method of claim 11, wherein the business constraints information includes:

financial cost information associated with a particular link;

partnership agreement information associated with a particular link; or customer service requirements associated with a particular link.

13. The method of claim 1, further comprising:

determining link scores for links in the autonomous system based on the topology model;

determining one or more of traffic modeling information for the autonomous system, qualified best path information for the autonomous system, redundancy information for the autonomous system, or business constraints information for the autonomous system;

calculating scores for particular links in the autonomous system based on a weighted average of the determined link scores and one or more of scores based on the traffic modeling information, scores based on the qualified best path information, scores based on the redundancy information, or scores based on the business constraints information; and wherein determining the best path for the selected context from the selected client BGP router to the external autonomous system is based on the calculated scores.

14. The method of claim 13, wherein the weighted average is based on weights selected based on the selected context.

15. The method of claim 1, further comprising:

selecting an external BGP router associated with another external autonomous system;

determining a next hop destination to the external autonomous system for the selected external BGP router, based on the detected route advertisement and based on the generated topology model; and providing the determined next hop destination to the selected external BGP router.

16. A computer system comprising:

logic configured to:

generate a topology model of an autonomous system associated with the computer system;

detect a route advertisement, relating to an external autonomous system, from a router;

select a client router;

determine a next hop destination to the external autonomous system for the selected client router, based on the detected route advertisement and based on the generated topology model;

select a context that specifies one or more of a particular quality of service class, an identifier identifying a particular customer, or a particular time period specifying a time of day, a day of week, or a range of calendar dates;

determine a best path for the selected context from the selected client router to the external autonomous system; and provide the determined next hop destination to the selected client router.

17. The computer system of claim 16, wherein the logic is configured to maintain a routing information base for the selected client router.

18. The computer system of claim 16, wherein the logic is further configured to:

determine link scores for links in the autonomous system based on the topology model;

determine one or more of:

traffic modeling information for the autonomous system, qualified best path information for the autonomous system, redundancy information for the autonomous system, or business constraints information for the autonomous system; and calculate scores for particular links in the autonomous system based on a weighted average of the determined link scores and one or more of scores based on the traffic modeling information, scores based on the qualified best path information, scores based on the redundancy information, or scores based on the business constraints information; and wherein determining the best path for the selected context from the selected client router to the external autonomous system is based on the calculated scores.

19. The computer system of claim 18, wherein the weighted average is based on weights selected based on the selected context.

20. A non-transitory computer-readable memory device storing instructions executable by a processor, the non-transitory computer-readable memory device comprising:

one or more instructions to generate a topology model of an autonomous system;

one or more instructions to determine link scores for links in the autonomous system based on the topology model;

one or more instructions to determine one or more of:

traffic modeling information for the autonomous system, qualified best path information for the autonomous system, redundancy information for the autonomous system, or business constraints information for the autonomous system;

one or more instructions to select a context that specifies one or more of a particular quality of service class, an identifier identifying a particular customer, or a particular time period specifying a time of day, a day of week, or a range of calendar dates;

one or more instructions to calculate scores for particular links in the autonomous system based on a weighted average of the determined link scores and one or more of scores based on the traffic modeling information, scores based on the qualified best path information, scores based on the redundancy information, or scores based on the business constraints information, wherein the weighted average is based on the selected context;

one or more instructions to detect a route advertisement, relating to an external autonomous system, from a Border Gateway Protocol (BGP) router;

one or more instructions to select a client BGP router;

one or more instructions to determine a next hop destination to the external autonomous system for the selected client BGP router, based on the detected route advertisement and based on the calculated scores;

one or more instructions to determine a best path for the selected context from the selected client BGP router to the external autonomous system; and one or more instructions to provide the determined next hop destination and the determined best path for the selected context to the selected client BGP router.

* * * * *